United States Patent
Giorgio et al.

(10) Patent No.: US 11,057,414 B1
(45) Date of Patent: Jul. 6, 2021

(54) ASYNCHRONOUS HIDDEN MARKOV MODELS FOR INTERNET METADATA ANALYTICS

(71) Applicant: Bridgery Technologies, LLC, Naples, FL (US)

(72) Inventors: Edward J Giorgio, Naples, FL (US); Clifford C Cocks, Cheltenham (GB); O Patrick Kreidl, Atlantic Beach, FL (US); Jeffrey S Prisner, Neshanic Station, NJ (US); Alan G Richter, Cocoa Beach, FL (US); Richard A Wisniewski, Williamsburg, VA (US)

(73) Assignee: Bridgery Technologies, LLC, Naples, FL (US)

( * ) Notice: Subject to any disclaimer, the term of this patent is extended or adjusted under 35 U.S.C. 154(b) by 0 days.

(21) Appl. No.: 16/986,252

(22) Filed: Aug. 5, 2020

Related U.S. Application Data

(60) Provisional application No. 62/883,050, filed on Aug. 5, 2019.

(51) Int. Cl.
| | | |
|---|---|---|
| *H04L 9/00* | (2006.01) | |
| *H04L 29/06* | (2006.01) | |
| *G06F 16/901* | (2019.01) | |
| *H03M 7/30* | (2006.01) | |
| *G06N 20/00* | (2019.01) | |
| *G06N 7/00* | (2006.01) | |

(52) U.S. Cl.
CPC ...... *H04L 63/1425* (2013.01); *G06F 16/9024* (2019.01); *G06N 7/005* (2013.01); *G06N 20/00* (2019.01); *H03M 7/3059* (2013.01); *H04L 63/1416* (2013.01)

(58) Field of Classification Search
CPC .... G06N 20/00; G06N 7/005; H04L 63/1416; H04L 63/1425; G06F 16/9024
See application file for complete search history.

(56) References Cited

U.S. PATENT DOCUMENTS

| | | | | |
|---|---|---|---|---|
| 10,313,372 | B2 * | 6/2019 | Heilig | H04L 63/1425 |
| 10,523,609 | B1 * | 12/2019 | Subramanian | H04L 63/1416 |
| 10,601,848 | B1 * | 3/2020 | Jeyaraman | H04L 63/145 |
| 2015/0372980 | A1 * | 12/2015 | Eyada | H04L 63/1416 726/1 |
| 2017/0264626 | A1 * | 9/2017 | Xu | H04L 63/145 |
| 2019/0207955 | A1 * | 7/2019 | El-Moussa | H04L 63/1441 |
| 2019/0207966 | A1 * | 7/2019 | Vashisht | H04L 63/1416 |
| 2020/0053104 | A1 * | 2/2020 | El-Moussa | G06N 3/084 |

* cited by examiner

*Primary Examiner* — Beemnet W Dada

(57) ABSTRACT

Implementations described and claimed herein provide systems, methods and computer-readable media with instructions for detecting anomalies in computer network traffic online, real-time, historical, forensic, and/or playback mode. The implementations can include monitoring network traffic metadata, parsing the metadata, constructing a multi-partite graph of nodes and edges based on a long-term incremental signal transformation or a short-term concurrent snapshot, and generating streaming analytics based on the multi-partite graph representing a likelihood that network traffic associated with a specified network component is infected with malware.

20 Claims, 11 Drawing Sheets

| | Step | Description |
|---|---|---|
| 1 | Metadata Collector | • Collects metadata events |
| 2 | Streams Processor | • Parses metadata events and maintains multiple queues containing sequential events (parallel queues). |
| 3 | Feature Extractor | • Extracts features from individual events<br>• Constructs snapshots (aggregated features) from multiple events.<br>• Constructs flowsets (common metadata activity) from multiple snapshots in event queues<br>• Implements/updates/maintains the graph processor incremental signal transformer to combine current event features with historical data maintained in the graph. |
| 4 | Graph Processor | • Implements/Updates/Maintains graph with<br>  ◦ extracted features from metadata events<br>  ◦ external TI & E data<br>  ◦ probability information received from streaming analytics<br>• Updates models from batch analytics<br>• Provides an interface through which the graph can be queried/examined/customized |
| 5 | Streaming Analytics | • Applies Markov filtering models to the streaming metadata events to update probability models stored in the multipartite graph<br>• Computes marginal probabilities.<br>• Updates top N lists of suspicious activity. |
| 6 | Alerting | • Applies marginal probabilities to alerting criteria and sends messages to enterprise assets as needed to support alerting workflows. |
| 7 | Batch Analytics | • Statistical model generation/updates requiring analysis of a large amount of, or possibly all, Graph Processor historical data.<br>• Apply analytic algorithms designed to detect novel malicious activity<br>• Updates top N lists of suspicious activity. |
| 8 | Threat Intelligence & Enrichment | • Acquires updated TI & E data from third party providers and annotates the graph and/or other internal databases. This may involve invoking APIs and database queries.<br>• Controls the Graph Processor ingestion processes for TI & E data |

FIG. 3

| Process | Description |
|---|---|
| Feature Extraction | Evolving event window |
| | Inter-arrival time distribution |
| | Bloom filters for graph edge approximation |
| | Common, uncommon, & rare websites |
| | Multi-partite graph building |
| Real-Time Machine Analytics | Natural/Machine Language Models |
| | Probability Models for observations given states |
| | State transition models |
| | Asynchronous time-series Hidden Markov Models |
| | Bayesian Network Graph Models |
| | Dynamic Bayesian Networks |
| | Markov Random Fields |
| | Decision Trees using marginal probabilities |
| Batch Analytics | Applications group clustering & probability models |
| | Work group clustering & probability models |
| | Transition Probs between work groups & application groups |
| | Finding dense subgraphs |
| | Static Bayesian Network Models |
| | Flowset multi-variate models |
| | Markov random field models |
| | Histogram bin sizes for Inter-Arrival Time distributions |
| | Flowset clustering & probability models |
| | Port & protocol behavioral models |
| | PCA models for dimensionality reduction |
| | Multivariate models for observations given state |

FIG. 9

| | Unknown State | | Possible States |
|---|---|---|---|
| 1 | Endpoint | = | Clean | Infected |
| 2 | Process | = | Benign | Malicious |
| 3 | Malware | = | Infected | Connected | Executing |
| 4 | Launch | = | Human | Automatic |
| 5 | Process Type | = | Browser | Email | App1 | App2 | ... |
| 6 | User | = | Good | Risky | Curious | Malicious |

|  | AHIMA DBN Component |
|---|---|
| 1 | Network metadata event types that are collected. |
| 2 | DBN Variables associated with metadata events.<br>2.1 Variables observed directly in metadata events<br>2.2 Hidden states (latent variables) associated with some observed objects<br>2.3 Hidden states (latent variables) associated with some enrichment objects |
| 3 | DBN hidden state variables that are associated with the nodes in a multi-partite graph |
| 4 | Probability models that tie observations to hidden states in the DBN. |
| 5 | Probability models that tie Threat Intelligence to hidden states in the DBN. |
| 6 | Machine learning used to develop parameters for the DBN state models. |
| 7 | Recursive Bayesian Estimation that averages over possible Markov chains underlying nodes in the DBN. |
| 8 | Machine learning used to develop parameters for the DBN. |
| 9 | Directed Acyclic (Multi-partite) Graph (DAG) for hidden variables in the DBN. |
| 10 | DBN joint probability density function for the hidden variables. |
| 11 | Computation of marginal probabilities for hidden variables from the DBN joint probability density functions. |

FIG. 12

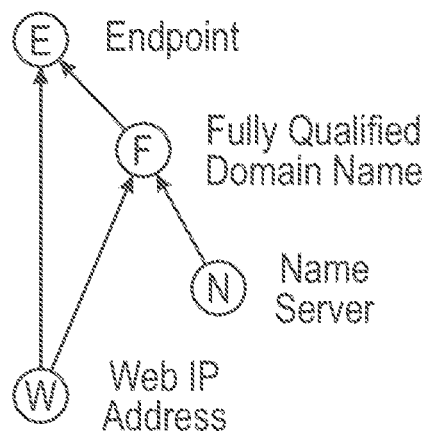

FIG. 13

ASYNCHRONOUS HIDDEN MARKOV MODELS FOR INTERNET METADATA ANALYTICS

RELATED APPLICATIONS

This application claims the benefit of U.S. Provisional Application No. 62/883,050 filed Aug. 5, 2019, the contents of which are herein incorporated by reference.

FIELD OF THE INVENTION

The present invention relates to applying artificial intelligence (AI) to the problem of hunting for and automatically detecting an Advanced Persistent Threat (APT), and the presence of malicious software, or malware, that may be employed by APT actors.

BACKGROUND

An APT actor aims to destroy the value of an enterprise by, for example, stealing data for economic espionage or direct monetary theft, or leverage access to enterprise resources for the APT's own purposes. It is patient, systematic, adaptive, and stealthy, while being serendipitous about its espionage goals. An APT actor is an advanced form of adversary who establishes a presence on a target system, and maintains that presence across system reboots, while evading detection by conventional NIDS techniques.

Finding an APT requires preliminary and continued reconnaissance. The APT rarely reuses domain names or IP addresses for its command and control communication, and it can obfuscate or modify itself, making simple pattern matching "signature" analyses largely ineffective. Furthermore, even without polymorphic code and obfuscated scripts, carefully constructed malware from an APT actor can run directly from memory and leave very few traces.

A system for automatically detecting malicious activity using data gathered from network sensors (NetFlow, Domain Name System (DNS), etc.) is generally referred to as a Network Intrusion Detection System (NIDS). NIDs are being superseded by Network Traffic Analysis Systems (NTAs), which add machine learning and advanced analytics to the rule-based detection characteristic of NIDs.

Even using these systems, APT malware is difficult to detect because it typically operates infrequently, uses low bandwidth for communication, and tends to use a variety of techniques to 'hide' its communications within ordinary network activity. As a result, available systems fail to detect a significant number of APTs that may be active at an enterprise.

SUMMARY OF THE INVENTION

AHIMA is an acronym for Asynchronous Hidden Markov Models (HMMs) for Internet Metadata Analytics. AHIMA can include an extensive set of modeling concepts, a large multi-partite graph, signal transformation techniques, and a very large joint probability density function using Dynamic Bayesian Networks, AI, and machine learning.

In some embodiments, AHIMA can have two main components: One is the behavioral machine analytic methods used to detect the presence of suspected malicious behavior from network sensors. The second uses those analytic results to facilitate the cyber hunting mission. Thus, AHIMA can be configured as a combination of both cyber relevant machine analytics and facilitated cyber hunter analytics.

AHIMA can be configured to use a number of customized implementation techniques to enable its execution on standard computing platforms. To detect the presence of an APT, AHIMA can represent and process an arbitrary amount of data in a sufficiently compact form that the AHIMA implementation does not require RAM beyond what can normally be configured on typical hardware. Thus, these implementation techniques enable fast execution, both for ingesting information and for responding to queries.

In some embodiments, the system applies Artificial Intelligence (AI) to the problem of hunting for and automatically detecting an Advanced Persistent Threat (APT), and the presence of malicious software—or malware—that may be employed by APT actors. The system can apply AI machine analytics in constructing a Network Intrusion Detection System (NIDS) termed herein as Asynchronous Hidden Markov Models (HMMs) for Internet Metadata Analytics (AHIMA).

In some embodiments, the system applies incremental signal transformation and lossy compression to the relevant history of network traffic metadata logs and stores the compressed history in a multi-partite graph with an arbitrary number of nodes in RAM or in other storage media. Nodes in the graph, which represent computer systems or aspects of network infrastructure, can encode or capture an unknown state (e.g., benign or infected) of a Markov chain. AHIMA uses machine learning to develop probability models for metadata observations given these states. AHIMA can have millions of HMMs running in parallel, in some cases one for each node in the graph, and it uses asynchronous HMMs to interleave them in time. A subset of the graph forms a directed acyclic graph (DAG), thus defining a Bayesian Network (BN). AHIMA generalizes the individual HMMs by allowing the state space to be represented in factored form (spatial-temporal model), instead of as a single discrete random variable. Thus, AHIMA is a synthesis of classical time-series analysis (HMM), and Bayesian belief-network models, where the static BN factors the belief-network into ten or more factors. AHIMA uses the synthesized model to compute the marginal probabilities for hidden variables within a very large joint probability distribution. When the marginal probabilities exceed any threshold as configured, they can be used for both dynamic real-time alerting and static forensic analysis.

In some embodiments, the system provides various interfaces by which the graph can be queried and updated, and these can be extended through the use of a shared-memory interface to allow programs resident and executing on the same computer to directly load processing modules or data objects into the same process space as the graph implementation. The system allows for further customization by adjusting the internal structure of the graph and can concurrently hold multiple such graph instantiations.

Some embodiments of the invention can include a computer-implemented system or method for detecting anomalies in computer network traffic, executed by one or more processors, the method including monitoring, by the one or more processors, network traffic metadata transmitted on a computer network during a first time interval by obtaining, from the one or more processors, a plurality of samples of the metadata of the network traffic during the first time interval, the metadata representing events to be monitored; parsing the metadata representing events to extract a set of features from the samples of the network traffic; inputting the parsed metadata to one or more of a long-term incremental signal transformation or a short-term concurrent snapshot using a lossy compressing algorithm; constructing, in a computer memory coupled to the one or more processors, a multi-partite graph of nodes and edges, based on one or more of the long-term incremental signal transformation or the short-term concurrent snapshot, wherein the nodes and edges are comprised of extracted features or aggregates of features from the metadata of the network traffic; updating the multi-partite graph with additional extracted features obtained during successive time intervals using the incremental signal transformation; generating streaming analytics based on the multi-partite graph, wherein the streaming analytics represent a likelihood that network traffic associated with a specified network component is infected with malware, wherein the streaming is performed by the use of at least one spatial and at least one temporal model, wherein each of the models are configured to update the parameters for underlying probability models based on a current metadata record and available enrichment data; and storing, by the one or more processors, data in the computer memory indicating the likelihood that the specified network component is infected with malware.

Further embodiments of the invention can be configured to select between network traffic metadata that is replayed from a storage device or network traffic metadata that is real-time or near real-time; to perform the parsing by metadata event parsers configured to consume arriving metadata event records, process the corresponding events, compress, and update the graph; and can include extracted features selected from one or more of: incremental signal transformation, concurrent flowsets, evolving event window, probabilistic counters, or Bloom filters.

Further embodiments of the invention can include a specified network component aggregated over multiple metadata records having common attributes; latent variable models and corresponding probability distributions selected from parametric, nonparametric, and neural network models; and a Dynamic Bayesian Network has a Bayesian Network spatial component and temporal component selected from a hidden Markov model or a recurrent neural network.

Further embodiments of the invention can include alerting a network or security operations center based on criteria determined either by AHIMA alerts or by a cyber-hunter utilizing AHIMA analytics; providing an interface for build, save, restore, query, annotate and customize of the information contained in the graph; and can include a multi-partite graph further comprising an arbitrary number of nodes stored in the computer memory, and wherein the nodes in the graph represent computer systems or aspects of network infrastructure and further can encode a state of benign or infected of a Markov chain.

BRIEF DESCRIPTION OF THE DRAWINGS

The present invention is illustrated by way of example, and not limitation, in the figures of the accompanying drawings in which:

FIG. 3 illustrates an example processing model.

FIG. 9 illustrates examples of the use of machine learning by AHIMA processes.

FIG. 12 illustrates an example of an AHIMA Dynamic Bayesian Network.

FIG. 13 illustrates an example of a four node subgraph.

DETAILED DESCRIPTION OF THE INVENTION

AHIMA applies machine analytics to event streams contained within enterprise-level network metadata (DNS, NetFlow, web proxy, etc.). These metadata events can contain a reference to a specific source and destination. The analytics can be based on the history of former bi-directional traffic flows between this pair. In addition, the analytics are supplemented with threat intelligence and enrichment information (TI&E), when available (see below for further explanations of these terms).

AHIMA maintains an ongoing historical record of network transactions. Such transactions might include, for example, a list of domains previously visited by enterprise endpoints, the times visited, the protocols used, and the amount of data transferred.

Enrichment data includes, but is not limited to, information about name servers, registrars, Autonomous System Numbers, geo-locations, as well as Threat Intelligence (TI). In some embodiments, this information is not derived directly from event streams, but instead from Internet-scope databases that contain registration and related information. TI could be as simple as a list of IP addresses associated with known or suspected malicious actors.

AHIMA can be configured to apply behavioral analytics to metadata history. AHIMA's approach to anomaly detection does not require host-based detection, deep packet inspection, web proxy inspection, content inspection, or URL security inspection. If a third-party device such as a web-proxy appliance applies any of these detection methods, AHIMA uses the associated indicators as third-party threat intelligence. These may be retrieved directly from IDS logs on demand or retrieved from a Security Information and Event Management (STEM) system or other archive. This third-party information is combined with the behavioral analytics to enhance the probability models within AHIMA, and thus is useful for alerting users and for additional analyses.

AHIMA uses a multi-partite graph to capture and maintain the history of the connection information and the TI&E. Probability models help identify malicious activity. These models form the basis of the decision tree for generating timely alerts and for guiding a human analyst through the cyber hunting process. Thus, AHIMA is both a machine analytics engine for online alerting and a cyber-hunting tool to assist human investigators.

AHIMA uses a range of indicators that, with varying degrees of confidence, indicate abnormal behavior and possible malicious activity. AHIMA utilizes the long-term historical information coupled with current metadata events to find malicious activity.

Figure 1:
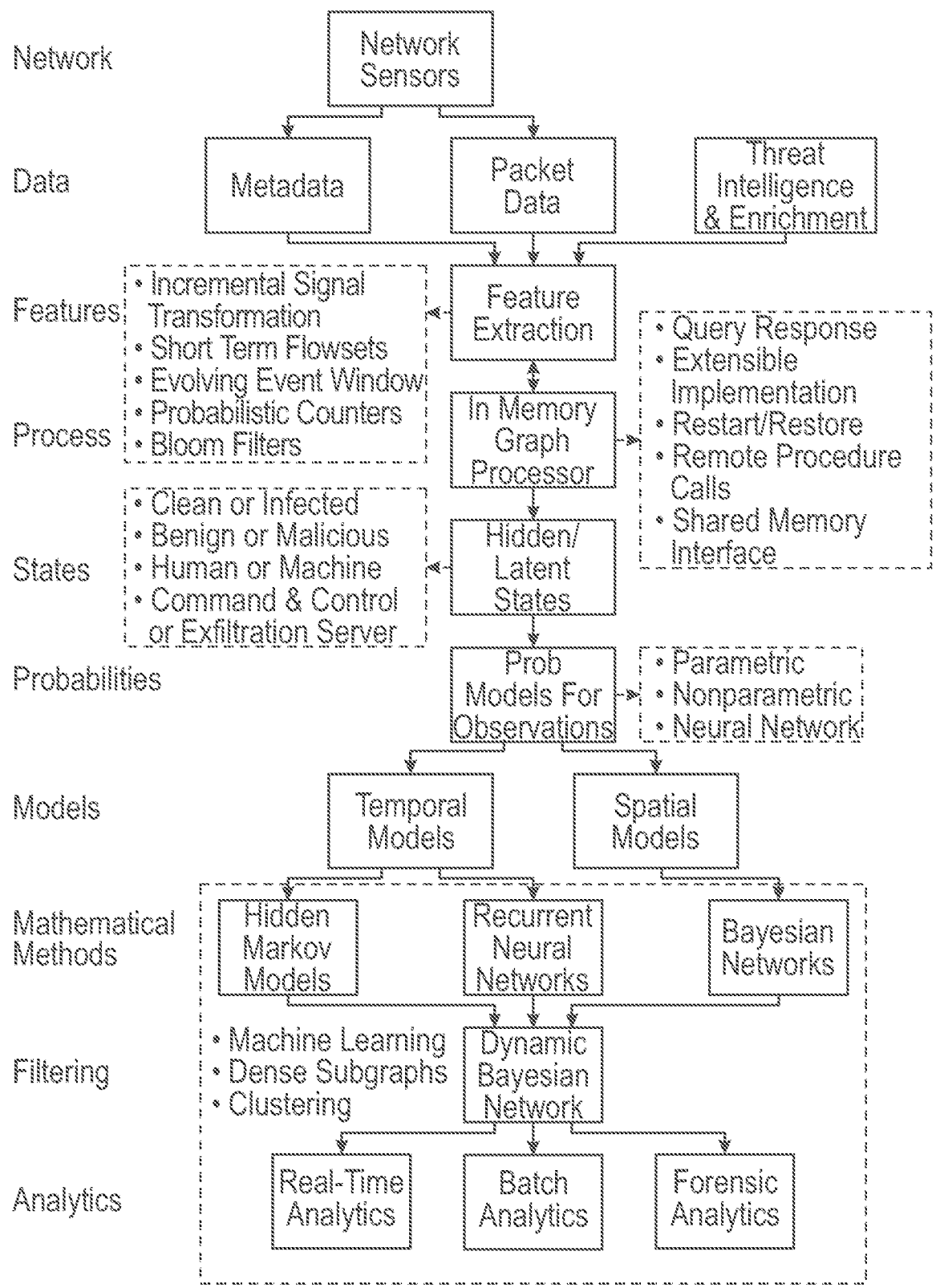
FIG. 1 illustrates an example overview of processes and logical modules for AHIMA.
Figure 2:
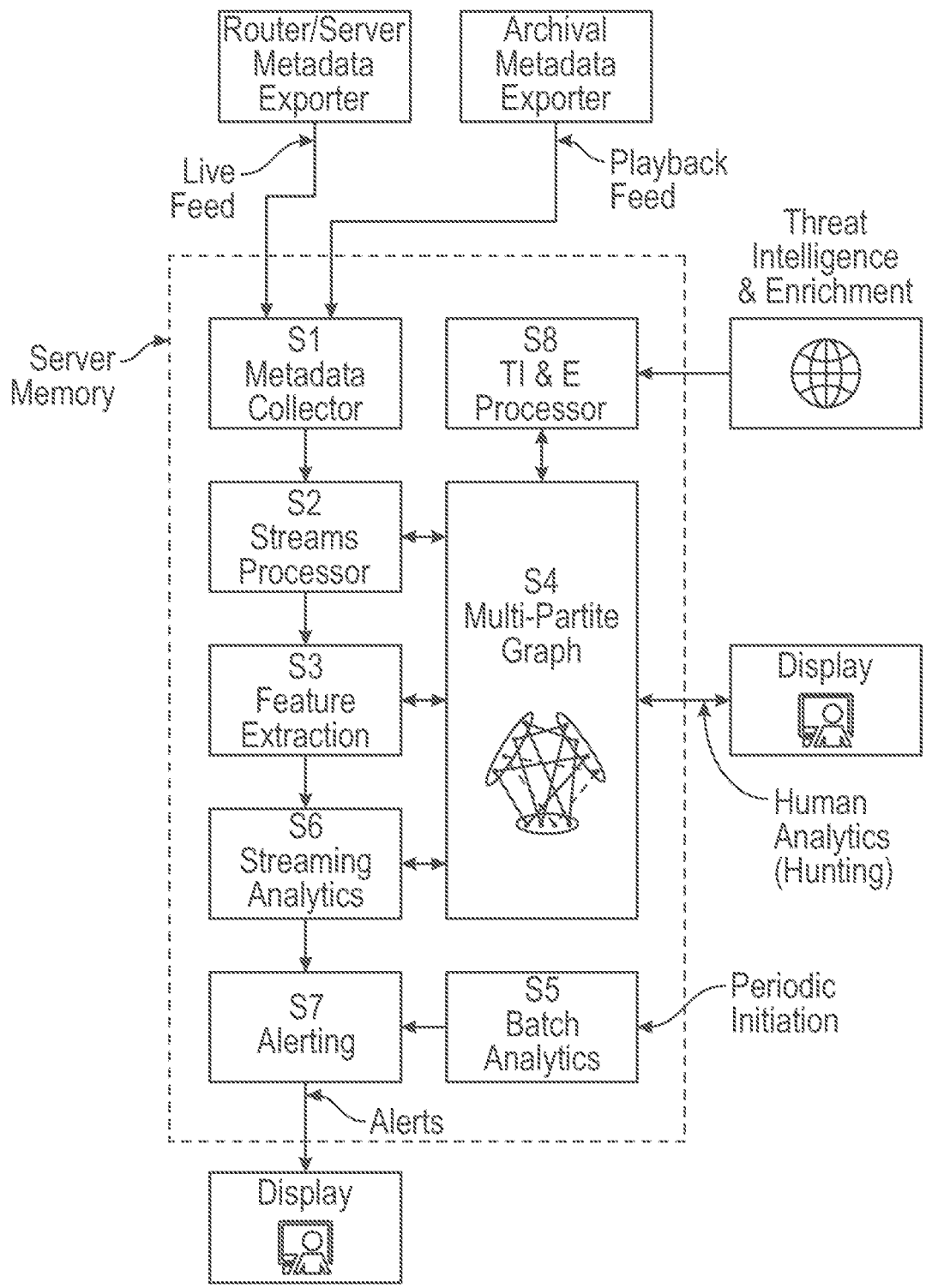
FIG. 2 illustrates an example processing architecture on an AHIMA server.

FIG. 1 illustrates an overview of processes and logical modules for AHIMA according to the invention. FIG. 2 illustrates an example processing architecture on an AHIMA server according to the invention. It is displayed as a single thread on a single machine, but scales with multiple threads and multiple servers. In some embodiments, the same thread in the same cluster must process the same enterprise endpoint. An example processing model can include the processing steps, as depicted in FIG. 3.

AHIMA operates asynchronously, online (triggered by the arrival of monitoring events), and simultaneously evaluates multiple enterprise endpoints for suspect activity based on arriving metadata events. It does this by monitoring metadata for information related to particular endpoints and modeling endpoints individually. Underlying AHIMA are core data-science algorithms that include machine learning, recursive Bayesian estimation, low-resolution time series analysis, non-parametric statistics, sophisticated data compression techniques, and much more. The real-time, or online, processing model for AHIMA can track hundreds of millions of connections and store numerous different contact statistics, each in a local, memory-resident graph. Four example components of AHIMA technology can include: ingest streaming network metadata from network sensors (or process stored metadata from one or more storage repositories); extract features using an incremental signal transformation and lossy compression; build and maintain a multi-partite graph that may be stored in memory to manage historical data; and apply a Dynamic Bayesian Network to the states of nodes in the graph.

Figure 4:
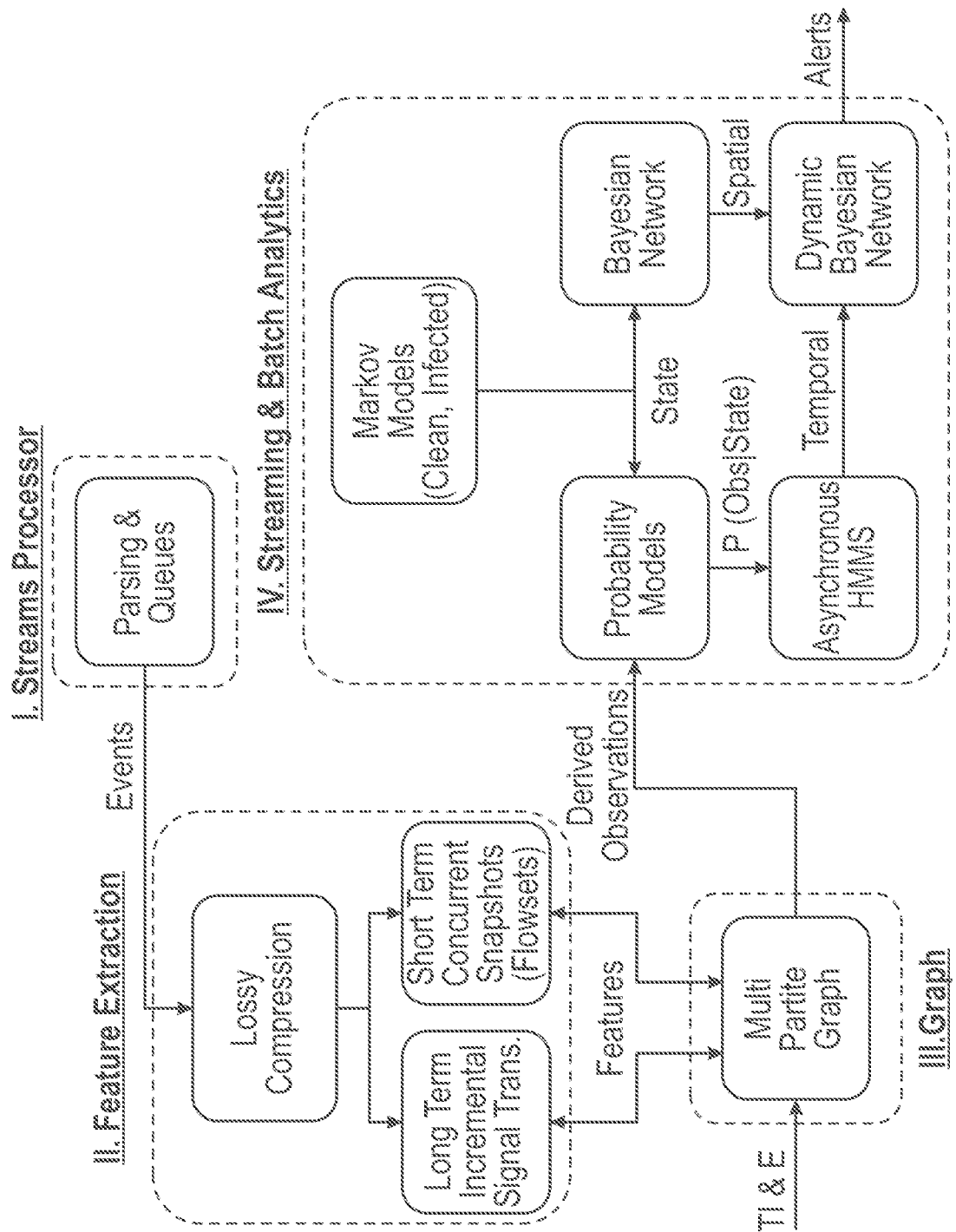
FIG. 4 illustrates processing that may be done in main memory of a single computer system.

FIG. 4 illustrates processing that may be done in main memory of a single computer system. The technology also can be employed in the case where the graph is processed in parallel in the memory of multiple clusters, or a cluster of multiple machines.

Metadata Collector

Metadata events are derived from several log types and collected by various mechanisms at various places in the network topology. NIST provides a reference for Computer Security Log Management, as does SANS. AHIMA makes use of log data collected within, or just outside, the enterprise (e.g., border router, proxy or firewall). Enterprise networks are often instrumented to save these logs. The event logs are of interest because they can relate to a type of malicious action that an attacker might attempt. These logs include, but are not limited to, DNS, NetFlow, DHCP, IDS/IPS, web proxy, TLS handshake, SOCKS, SSL proxy, firewall, login attempts, authentication, account changes, etc.

Streams Processing

Figure 5:
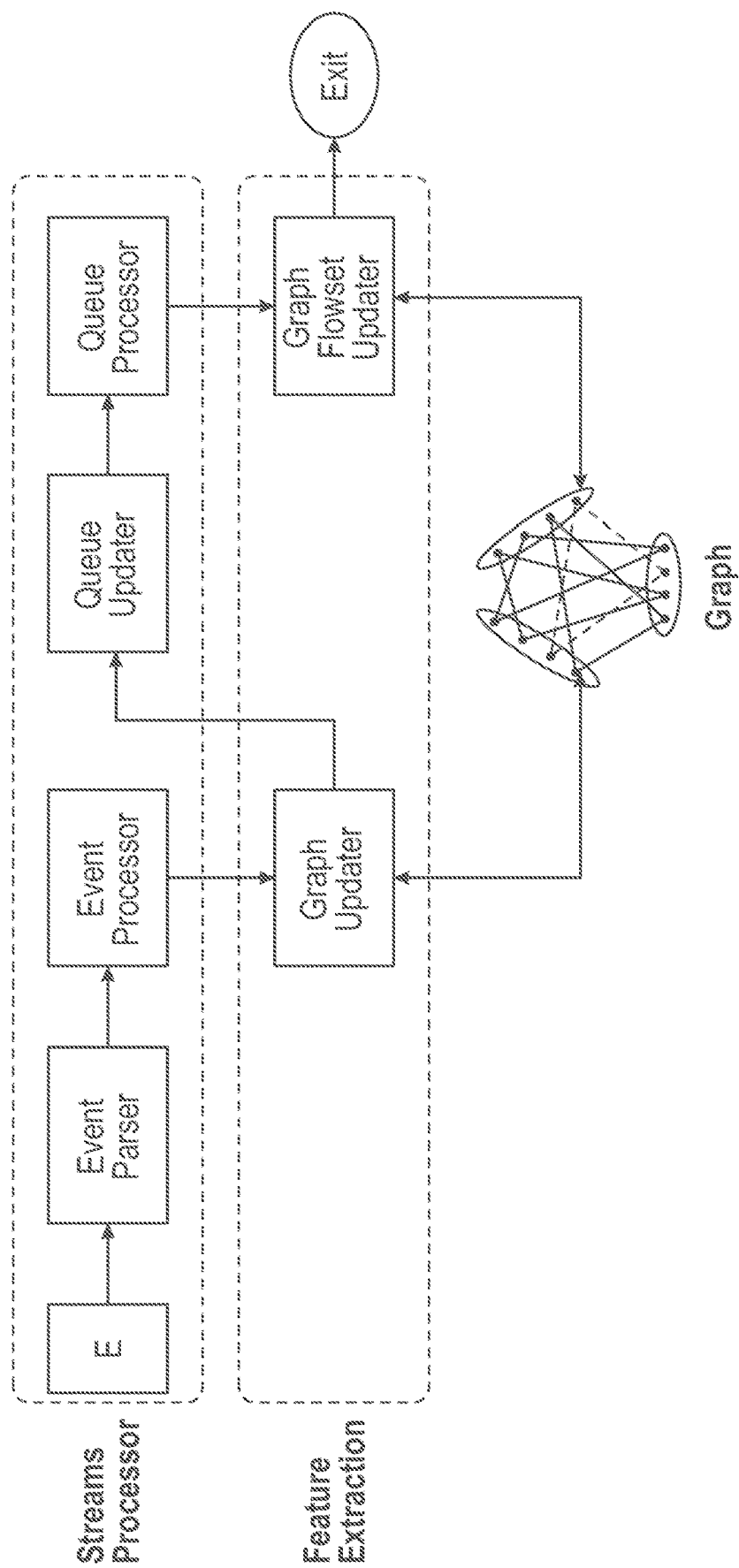
FIG. 5 illustrates an example event delivered to an event parser that extracts fields of interest.

During parsing, arriving metadata event records may be directed to parsers and then on to the event processors and the queue update. The queue update function maintains time-ordered queues for endpoints referenced in the metadata. The meta-data streams processor reads incoming data from on-line "live" sensors and/or archival off-line data. These events are sent to the graph updater and are also used to establish and maintain endpoint queues. As illustrated in FIG. 5, event E is delivered to an event parser that extracts fields of interest from the metadata records. The events are then interpreted and passed to the graph updater that may make one or more modifications to the graph. During parsing, per-type event parsers consume arriving metadata event records, process the corresponding events, and update the graph as required. Subsequently, the queue updater and queue processor maintain the endpoint queues and potentially, depending on triggering conditions, update the graph with flowsets and/or flowset features.

Feature Extraction

Event features exist for various sources of sensor data, such as, but not limited to, DNS, NetFlow, and web proxy events. For any of these event types, there may be thousands or millions of events involving the same connection node (e.g, the same connection-specific properties may be present in NetFlow meta-data records many times). These events are summarized, transformed, compressed, and aggregated into one node representing that connection, and stored in the graph as node data within the appropriate connection node. Data about other graph node types is also summarized, compressed, and stored in a fashion associated with the corresponding primary or secondary node(s). The node data contains the features which are continuously updated using an Incremental Signal Transform (IST). These features, which capture a variable and possibly long-term time history, are used in both supervised and unsupervised learning to detect both anomalous and malicious activity.

The features extracted are designed to preserve information about the event metadata history, both long term and short term in a compact fashion. All metadata between a given pair of devices are characterized as an unevenly spaced time series of events. Critical properties of these time series are retained for both the real-time and batch analytics.

Metadata history is usually too large for real-time analytics to be practical or efficient without some form of compression or reduction. For this reason, the system can aggregate many events and maintain summary statistics for similar events. Over a long period of time, AHIMA can aggregate using a larger number of components to reduce the data load, while, over a short period of time, it might aggregate using a smaller number of the components to achieve finer detail. This leads to two types of summary records stored in the AHIMA graph: long term records that aggregate over a large number of similar metadata records; and short term records that aggregate over a small number of similar metadata records.

Long Term Incremental Signal Transformation (IST)

AHIMA uses a signal transformation to represent both the time and frequency domain of an unequally spaced time series of events. In the frequency domain, the system uses the distribution of inter-arrival times (IAT) and, in the time domain, the system uses an evolving event window (EEW). Additionally, there are other signal components that describe the unevenly spaced time series of events. Many of these signal components are saved using either means, variances, histograms, Bloom filters, and hybrid probabilistic counters. Examples include: Evolving Event Window (EEW), Volumetric Connection Statistics (VOL), Temporal Day/Week Histogram (TDW), Connection Duration (DUR), Send-Receive Polarity Chain (SRC), and Inter-Arrival Time (TAT).

Short Term Records: Flowsets

In cases where an endpoint contacts a website for the first time, AHIMA snapshots nearby-in-time activity into the graph in the form of a Flowset. Flowsets capture metadata activity that is common to an address (usually an enterprise endpoint) within a small period of time. Flowset footprints are a collection of features extracted from the Flowset.

Flowset records aggregate multiple DNS, NetFlow, web proxy and other metadata events associated with an endpoint. These events are compressed and stored as endpoint flowsets in the flowset connection records. The flowset records can later be used to visualize a series of events, and they are also used in the machine analytics. Flowset features extracted from the flowsets are called footprints or behavioral profiles.

AHIMA Multi-Partite Graph

Figure 6:
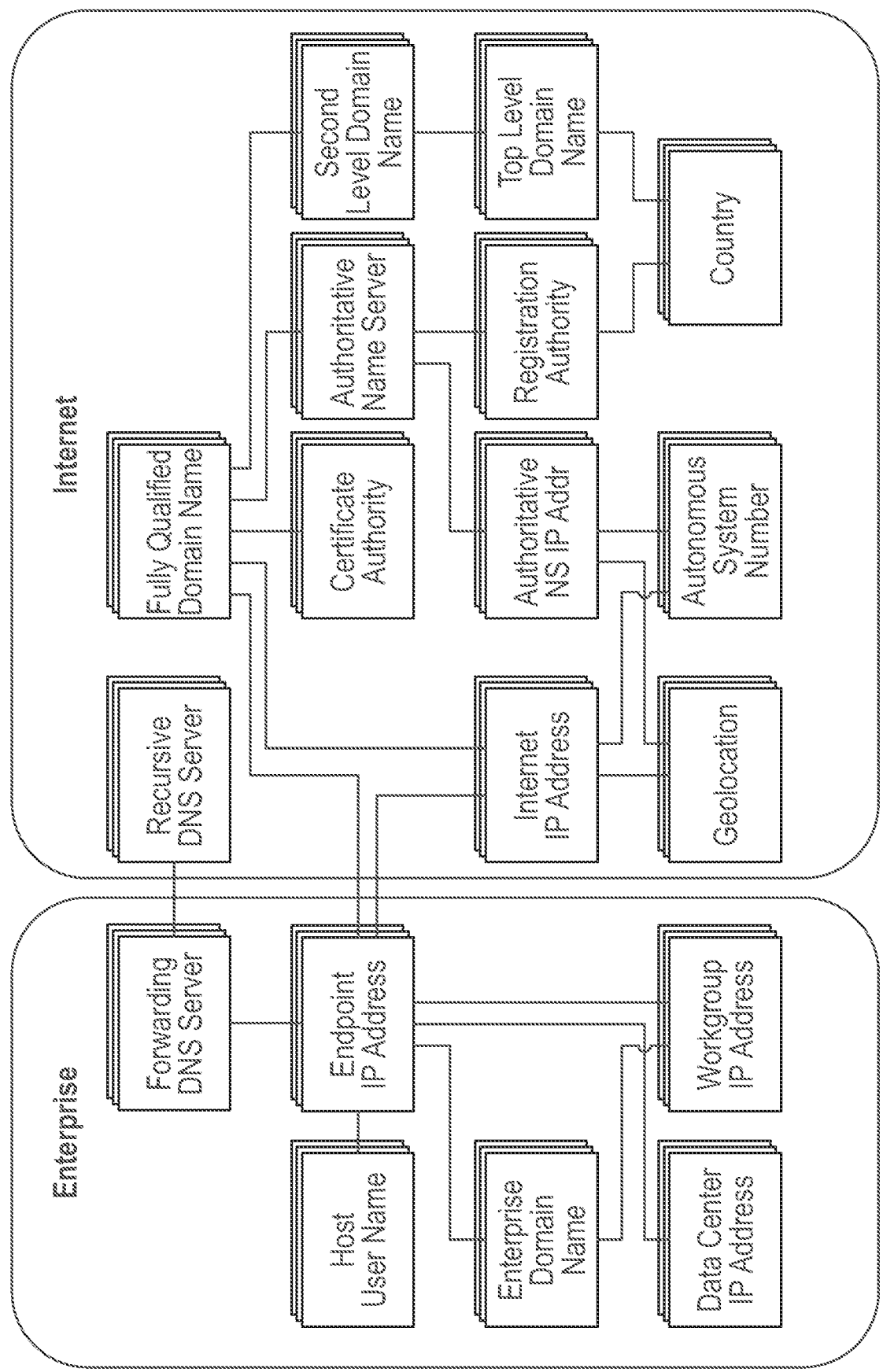
FIG. 6 illustrates an example AHIMA graph reference model.

AHIMA uses a multi-partite graph to store the metadata event history and to make data easily retrievable for analytics. Parts of the graph are collections of nodes of the same type arranged for efficient searching and data access. An example AHIMA graph reference model is illustrated in FIG. 6. The reference model distinguishes between enterprise endpoints and external (Internet) entities. The part of the graph labeled 'endpoint IP Address' is shaded because it identifies the primary assets the system is monitoring and ultimately trying to protect.

The edges in the graph reference model generally represent information that is derived from the metadata (DNS, NetFlow, etc.), but some edges represent information obtained from Threat Intelligence and Enrichment data (TI&E)

The AHIMA multi-partite graph provides not only processing of metadata events, but also may respond to externally generated user queries. These queries allow an operator or other user to query various aspects of the graph. Examples include, but are not limited to, inquiring as to the number of nodes (e.g., primary or connection) in the graph, the number of graph edges between nodes, the number of times a particular endpoint or other graph node set element has been encountered in metadata events, etc. These data are conveyed using a remotely accessible API implemented using one or more interfaces (e.g., RPC, REST-style web transactions). In addition, a shared-memory interface is supported which allows programs resident and executing on the same computer to directly load processing modules or data objects into the same process space as the graph implementation.

The AHIMA multi-partite graph is accessible to queries as a network service. The graph processes incoming information in an on-line fashion or can be pre-loaded using archival information. Subsequently, the graph contains the information processed to date and network clients can make a connection to the graph and perform queries. After a query is serviced the graph continues in operation in parallel to the results being returned. In other words, the graph internals are persistent in computer memory beyond the time of interaction between a client program and the graph service.

Multiple forms of multi-partite graphs may be in memory and available simultaneously to a multiplicity of network clients.

The graph server implements the ability to save its internal state to a file or other media as a result of a trigger initiated by a user, program, or timer. The internal state represents the state (i.e., in memory representation) of a graph instance. State is maintained separately for graph instances. This state may also be restored to reconstruct a graph's contents quickly. This benefit is significant, in that to restore the contents of a graph, re-processing of metadata events is not necessary. Consequently, program run-time can be substantially improved.

The multi-partite graph made available via the graph service may be implemented using various methods. One embodiment involves the use of hash tables for the graph nodes. In this case, data contained within the tables may contain the fields of interest obtained as a result of metadata event parsing. This is used, for example, in the implementation of connection nodes.

Streaming Analytics

In some embodiments, as a non-limiting example, the streaming analytics can be architected with four components: finite state models (including deep hidden states); conditional probability models for observations (including artificial neural networks); dynamic Bayesian networks (including recurrent neural networks); and machine learning (including backward propagation and similar algorithms).

The finite state models are used to describe the state of each node in the graph. An example is an endpoint node, which represents an assessment of a computer within the protected enterprise and may be in the clean or infected state, or a website node that could be in the benign, phishing (associated with fraudulent messaging), or malicious state.

The conditional probability models for observations express the probability of an observation given that a node is in a specific state. An example is the probability that an endpoint is in the infected state given that beaconing is observed from that endpoint.

The dynamic Bayesian network is a synthesis of classical time-series analysis (hidden Markov models), and Bayesian belief-network models (BBN), where the static Bayesian network (BN) factors the belief-network into ten or more factors. The system can use the synthesized model to compute the marginal probabilities for hidden variables within a very large joint probability distribution.

The machine learning is done both in batch mode and in the streaming analytics. The first three components above all have parameters, which are learned from either supervised or unsupervised learning. An unsupervised learning example is the clustering of endpoints by the time of day they are active. A supervised learning example is the computation of parameters for observing extracted features from a honeypot and comparing those to normal features to find wide separation between the two probability distributions.

Network metadata events contain observed variables and imply other variables. Some of these variables correspond to nodes in the AHIMA graph, which have unknown states associated with them. AHIMA employs probability models for the observations given these unknown states. Parameters for these models are developed using machine learning.

Figure 7:
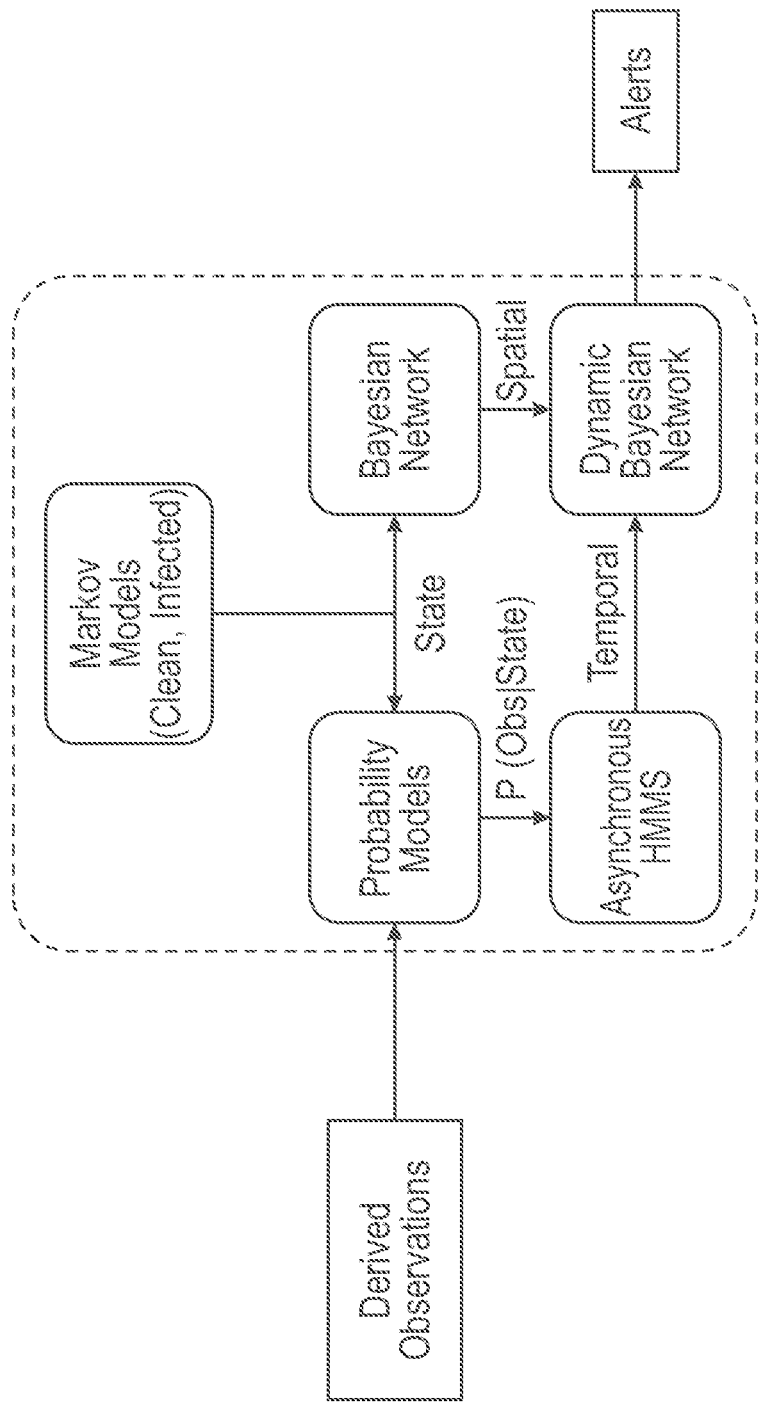
FIG. 7 illustrates an example use of observed and implied variables.

The unknown states of the AHIMA model are represented by many Markov chains operating in parallel; AHIMA uses asynchronous HMMs to interleave them in time. It then generalizes the individual HMMs by allowing the state space to be represented in factored form, instead of as a single high dimensional multivariate random variable. The resulting Bayesian network (BN) is called a Tree Structured Dynamic Bayes Network (AHIMA DBN). Thus, the AHIMA DBN is a synthesis of classical time-series analysis (HMM), and Bayesian belief-network (BBN) models, where the static BN factors the belief-network into multiple (ten or more) factors, which are related to different variables. FIG. 7 illustrates an example of how the observed and implied variables are used in the enterprise AHIMA DBN.

Markov Filtering

The AHIMA online streaming machine analytics can employ Markov filtering. It utilizes a spatial-temporal model that updates the parameters for the underlying probability models based on the metadata record currently being examined, and enrichment data that may be available—these constitute the current observations. A dynamic Bayesian network (DBN) is then used to make a single step in the HMM/Bayesian network objects associated with the current record. Following this step, the marginal probabilities are updated and then used for decision making, using decision trees. A decision, for example, might be sending an alert or placing an endpoint in quarantine.

Batch Analytics

Unlike streaming analytics which are done in an online fashion along with event parsing and feature extraction, batch analytic processes require information from many, and sometimes all, the nodes in the graph. The results of the batch analytics are used to update models periodically as the graph changes, or when other new information (e.g., TI or other enrichment information) is received. These results are also used by the streaming analytics. For example, some of the functions performed by the batch analytics are: clustering endpoints by their behavior; clustering web sites by their behavior; finding dense subgraphs (communities of interest) in the AHIMA graph; classifying activity as being either human generated or machine generated; and finding new behaviors that have not been seen previously.

Alerting

AHIMA uses models to compute the marginal probabilities for hidden variables within a very large joint probability distribution. When the marginal probabilities exceed any threshold as configured, they can be used for both dynamic online alerting and static forensic analysis.

Machine Learning

Figure 8:
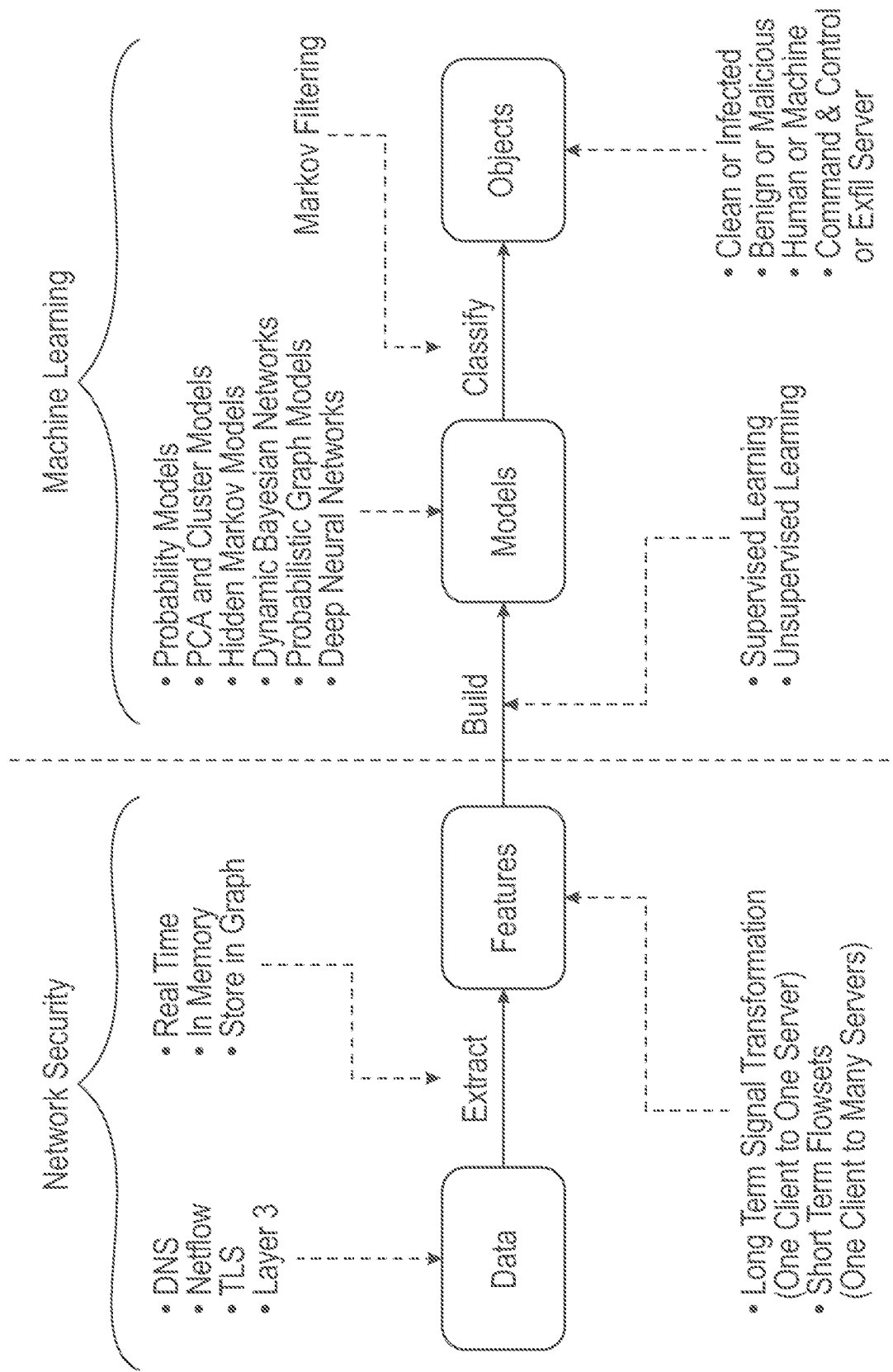
FIG. 8 illustrates an example system view of various AHIMA components.

FIG. 8 illustrates an example system view of how various AHIMA components can fit into the 3-step machine learning process, including: extracting features from data, building models from features, and classifying objects from models. FIG. 9 illustrates examples of the areas where machine learning is used by AHIMA processes.

AHIMA

In some embodiments, AHIMA can be a system and method for monitoring current and/or historical network event log data and enabling the online (or forensic playback) discovery of anomalous, especially malicious, activity through the use of machine learning and streaming machine analytics. The method for monitoring event log data can include one or more of:

1. receiving, either actively from a sensor device or replayed from data logs, metadata representing events to be monitored from computers, servers, routers, other physical or virtual network devices, or archival storage;
2. parsing the events, in one or more processors simultaneously, with a streams processor that may contain parallel event queues, and in some circumstances creating other events;
3. combining an event with the history of events having common parameters contained in the in-memory multi-partite graph or other data structure, incrementally transforming the combined events to a compressed form, and preprocessing the event history to a form suitable for streaming analytics, using evolving event windows, bloom filters, hybrid counters, probability distributions for inter-arrival times, and compressed time series representation;
4. updating the transformed history of events stored in an in-memory multi-partite graph; which can be implemented using a collection of multi-index hash tables and presence indicators (or other embodiments that might utilize different data structures);
5. applying streaming analytics in real (or replay) time, to determine anomalous activity using mathematical models incorporating machine learning, Dynamic Bayes Networks, Asynchronous Hidden Markov Models;
6. applying, either periodically or on-demand, batch analytics to the multi-partite graph and other data structures to update the probability models involved;
7. ingesting threat intelligence and enrichment data from third parties in real or non-real-time and incorporating it for analyses;
8. alerting the network/security operations center based on criteria determined either by AHIMA or by a combination of AHIMA and other sources of information;
9. receiving, processing and responding to external (human or machine) queries;
10. providing the AHIMA graph building and maintenance processing as a service;
11. providing an extensible implementation wherein the service may offer multiple alternative, customized version of the graph that may optionally contain differing aggregate statistical information;
12. providing the ability to save, to a file or other media, the internal state of the graph process so as to facilitate subsequent restart/restore operations that avoid the need to re-process input data;
13. the ability for programs to access data within the graph using a remote procedure call API/interface; and/or
14. the ability for programs to access data within the graph using a shared memory interface (in which the subject program executes within the same process/memory context as the graph itself).

Models and Networks: Hidden State Models

Figures 10, 11:
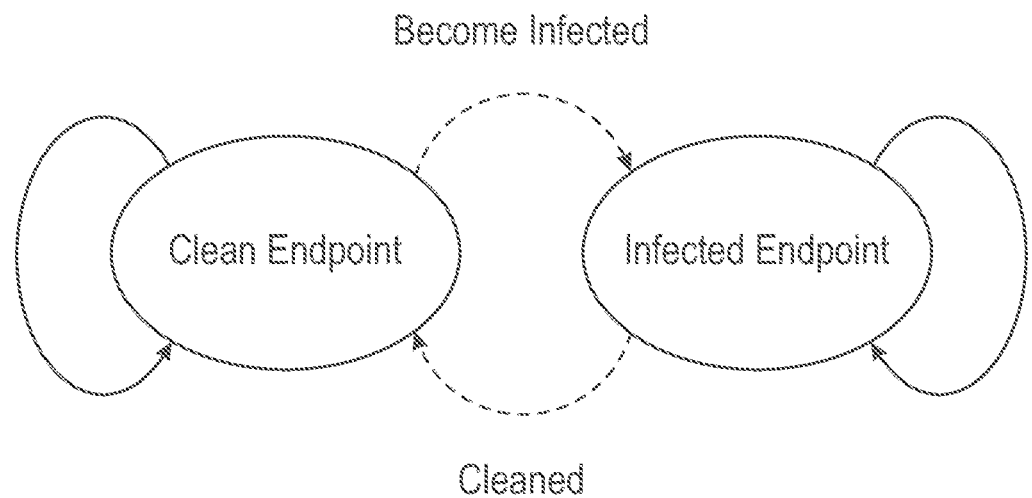
FIG. 10 illustrates an example model for an endpoint.
FIG. 11 illustrates example possible states for various classification variables.

A Markov model is a form of finite state automata (FSA) used to model randomly changing systems called Markov chains. A special case of an FSA is a nondeterministic finite automaton (NFA). When an NFA follows a probabilistic model, it is called a probabilistic finite state automaton. Graphical models are defined that capture various concepts about endpoints, people using those endpoints, and the possibility that an endpoint is infected. These concepts are modeled as the unknown underlying states of a Markov chain. FIG. 10 illustrates an example simple 2-state model for an endpoint which indicates whether the endpoint is considered infected (in at least one way) or not infected (clean).

There are several other factors that decompose the clean or infected states into more detailed states. This is useful because the probability models for the decomposed states will have a stronger probability relationship with the metadata observed. FIG. 11 illustrates example possible states for various classification variables.

Models and Networks: Conditional Probability Models

Given an observed metadata event $\theta$ we compute the probability of the metadata observation given the unknown state (ex. benign or malicious) of the hidden variables. This probability will, in general, have several factors, each of which potentially have different underlying probability distributions. Each factor may come from: a closed form parameterized distribution for which we fit a parameter, including but not limited to: power-law distribution, exponential distribution, log normal distribution, or coupon collector's distribution; or a nonparametric distribution derived from an observed histogram, including a log scoring method which rotates multivariate data to eigen-vector space, constructs a histogram with equally probable bins, and scores rotated observations; or output of a neural network.

Models and Networks: Dynamic Bayesian Networks (DBN)

As a non-limiting example, FIG. 12 illustrates major components of the AHIMA DBN.

Models and Networks: AHIMA Directed Acyclic Graph (DAG)

The unknown states in the AHIMA model are represented by millions of Markov chains operating in parallel and we use asynchronous HMMs to interleave them in time. We then generalize the individual HMMs by allowing the state space to be represented in factored form, instead of as a single high dimensional multivariate discrete random variable. Thus, the AHIMA model is a synthesis of classical time-series analysis (HMM), and Bayesian belief-network models (BBN), where the static BN factors the belief-network into ten or more factors.

From the AHIMA graph we define a Directed Acyclic Graph (DAG). An example of a four node subgraph composed of the internal endpoint IP address (E), the external (Internet) Fully Qualified Domain Name (F) and its associated Web IP address (W), along with the TI&E obtained Name Server (N) is illustrated in FIG. 13.

In this example, the 4-dimensional multivariate distribution (E, F, W, N) factors as $P(E,F,W,N)=P(E|W,F) P(F|W,N)P(W)P(N)$ Example Implementation Architectures Some embodiments of the systems, methods, and operations described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer storage medium for execution by, or to control the operation of, data processing apparatus.

Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the foregoing. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some embodiments of the methods and operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

The invention claimed is:

1. A computer-implemented method for detecting anomalies in computer network traffic, executed by one or more processors, the method comprising:
   monitoring, by the one or more processors, network traffic metadata transmitted on a computer network during a first time interval by obtaining, from the one or more processors, a plurality of samples of the metadata of the network traffic during the first time interval, the metadata representing events to be monitored;
   parsing the metadata representing events to extract a set of features from the samples of the network traffic;
   inputting the parsed metadata to one or more of a long-term incremental signal transformation or a short-term concurrent snapshot using a lossy compressing algorithm;
   constructing, in a computer memory coupled to the one or more processors, a multi-partite graph of nodes and edges, based on one or more of the long-term incremental signal transformation or the short-term concurrent snapshot, wherein the nodes and edges are comprised of extracted features or aggregates of features from the metadata of the network traffic;
   updating the multi-partite graph with additional extracted features obtained during successive time intervals using the incremental signal transformation;
   generating streaming analytics based on the multi-partite graph, wherein the streaming analytics represent a likelihood that network traffic associated with a specified network component is infected with malware, wherein the streaming is performed by the use of at least one spatial and at least one temporal model, wherein each of the models are configured to update the parameters for underlying probability models based on a current metadata record and available enrichment data; and
   storing, by the one or more processors, data in the computer memory indicating the likelihood that the specified network component is infected with malware.

2. The method of claim 1, wherein the method is configured to select between network traffic metadata that is replayed from a storage device or network traffic metadata that is real-time or near real-time.

3. The method of claim 1, wherein the parsing is performed by metadata event parsers configured to consume arriving metadata event records, process the corresponding events, compress, and update the graph.

4. The method of claim 1, wherein the extracted features are selected from one or more of: incremental signal transformation, concurrent flowsets, evolving event window, probabilistic counters, or Bloom filters.

5. The method of claim 1, further comprising the specified network component aggregated over multiple metadata records having common attributes.

6. The method of claim 1, further comprising latent variable models and corresponding probability distributions which are selected from parametric, nonparametric, and neural network models.

7. The method of claim 1, further comprising a dynamic Bayesian network comprising a Bayesian network spatial component and the temporal component is selected from a hidden Markov model or a recurrent neural network.

8. The method of claim 1, further comprising alerting a network or security operations center based on criteria determined either by AHIMA alerts or by an operator utilizing AHIMA analytics.

9. The method of claim 1, further comprising providing an interface for build, save, restore, query, annotate and customize of the information contained in the multi-partite graph.

10. The method of claim 1, wherein the multi-partite graph further comprises an arbitrary number of nodes stored in the computer memory, and wherein the nodes in the graph represent computer systems or aspects of network infrastructure and further can encode a state of benign or infected of a Markov chain.

11. A computer-implemented system for detecting anomalies in a computer network traffic executed by one or more processors, the system comprising a processor configured for:
   monitoring, by the one or more processors, network traffic metadata transmitted on a computer network during a first time interval by obtaining, from the one or more processors, a plurality of samples of the metadata of the network traffic during the first time interval, the metadata representing events to be monitored;

parsing the metadata representing events to extract a set of features from the samples of the network traffic;

inputting the parsed metadata to one or more of a long-term incremental signal transformation or a short-term concurrent snapshot using a lossy compressing algorithm;

constructing, in a computer memory coupled to the one or more processors, a multi-partite graph of nodes and edges, based on one or more of the long-term incremental signal transformation or the short-term concurrent snapshot, wherein the nodes and edges are comprised of extracted features or aggregates of features from the metadata of the network traffic;

updating the multi-partite graph with additional extracted features obtained during successive time intervals using the incremental signal transformation;

generating streaming analytics based on the multi-partite graph, wherein the streaming analytics represent a likelihood that network traffic associated with a specified network component is infected with malware, wherein the streaming is performed by the use of at least one spatial and at least one temporal model, wherein each of the models are configured to update the parameters for underlying probability models based on a current metadata record and available enrichment data; and storing, by the one or more processors, data in the computer memory indicating the likelihood that the specified network component is infected with malware.

12. The system of claim 11, wherein the method is configured to select between network traffic metadata that is replayed from a storage device or network traffic metadata that is real-time or near real-time.

13. The system of claim 11, wherein the parsing is performed by metadata event parsers configured to consume arriving metadata event records, process the corresponding events, compress, and update the graph.

14. The system of claim 11, wherein the extracted features are selected from one or more of: incremental signal transformation, concurrent flowsets, evolving event window, probabilistic counters, or Bloom filters.

15. The system of claim 11, further comprising the specified network component aggregated over multiple metadata records having common attributes.

16. The system of claim 11, wherein the latent variable models and corresponding probability distributions are selected from parametric, nonparametric, and neural network models.

17. The system of claim 11, further comprising a dynamic Bayesian network comprising a Bayesian network spatial component and the temporal component is selected from a hidden Markov model or a recurrent neural network.

18. The system of claim 11, further comprising alerting a network or security operations center based on criteria determined either by AHIMA alerts or by an operator utilizing AHIMA analytics.

19. The system of claim 11, further comprising providing an interface for build, save, restore, query, annotate and customize of the information contained in the graph.

20. The system of claim 11, wherein the multi-partite graph further comprises an arbitrary number of nodes stored in the computer memory, and wherein the nodes in the graph represent computer systems or aspects of network infrastructure and further can encode a state of benign or infected of a Markov chain.

* * * * *